United States Patent
Ethington

(10) Patent No.: US 6,321,818 B1
(45) Date of Patent: Nov. 27, 2001

(54) TIRE SERVICING TOOL

(75) Inventor: Bradley Gayle Ethington, Rudd, IA (US)

(73) Assignee: Iowa Mold Tooling Co., Inc., Garner, LA (US)

( * ) Notice: Subject to any disclaimer, the term of this patent is extended or adjusted under 35 U.S.C. 154(b) by 0 days.

(21) Appl. No.: 09/621,153

(22) Filed: Jul. 21, 2000

(51) Int. Cl.⁷ .................................................. B60C 25/132
(52) U.S. Cl. ............................................ 157/1.17; 157/1.2
(58) Field of Search ............................ 157/1, 1.1, 1.2, 157/1.13, 1.17, 1.26, 1.28, 1.3, 1.33, 1.35

(56) References Cited

U.S. PATENT DOCUMENTS

| | | | |
|---|---|---|---|
| 3,253,640 | * | 5/1966 | Paulauskas ........................... 157/1.17 |
| 3,500,891 | * | 3/1970 | Collins ................................... 157/1.2 |
| 6,182,736 | * | 2/2001 | Cunningham et al. ............... 157/1.2 |

* cited by examiner

*Primary Examiner*—D. S. Meislin
(74) *Attorney, Agent, or Firm*—Wood, Phillips, VanSanten, Clark & Mortimer

(57) ABSTRACT

A tool for use in installing the bead seat band (44) and rim flange (42) of a multiple piece wheel as part of a tire changing or servicing operation that includes a tool body (10) having a corner with a first elongated surface (34) at the corner adapted to engage a rim flange (42) and a bead seat band (44) in an axial direction. The tool includes a second elongated surface (36) at the corner adjacent the first surface (34) at an acute angle to the first surface and adapted to engage the rim flange (42) in an axial direction at a location spaced from the intended point of engagement of the ring flange (42) by the first surface (34). The first and second surfaces (34), (36) define a notch (32) opening away from the body (10) and a tool mounting fixture (26) is connected to the body (10) generally opposite the notch (32).

9 Claims, 2 Drawing Sheets

TIRE SERVICING TOOL

FIELD OF THE INVENTION

This invention relates to a tire servicing tool, and more specifically, to a tool usable in installing or removing the bead seat band and rim flange of a multiple piece wheel as part of a tire changing or servicing operation.

BACKGROUND OF THE INVENTION

Many vehicles in use today, as, for example, off the road vehicles and trucks, employ two or more wheels of the multiple piece variety as opposed to so-called "drop center" wheels commonly employed on passenger cars. While the actual construction of a multiple piece wheel may vary to some degree, they are characterized by a wheel rim that includes at least one removable rim flange which is placed upon the rim after a tire has been installed on the rim. A bead seat band is then located within the rim flange and includes a flange employed to retain the rim flange. The rim includes a first peripheral groove near one side thereof for receipt of an O-ring seal and a second groove axially outward of the O-ring groove which receives a resilient lock ring. The O-ring creates a seal between the bead seat band and the rim while the lock ring bears against a flange on the bead seat band to hold the same in place on the rim when the tire is inflated.

When a tire is installed on or removed from the rim, it is conventionally necessary to move the bead seat band axially inwardly on the rim so as to achieve access to both the O-ring groove and the lock ring groove so that an O-ring may be installed or removed and the lock ring installed or removed.

Typically, relatively high forces are required to move the bead seat band axially inwardly on the rim because of forces resisting such movement imposed upon the bead seat band via the rim flange from the side wall of the tire. Moreover, ready access to the grooves in the rim, particularly that receiving the lock ring, is required to allow easy access to an installed lock ring or to install a lock ring because of the resilient nature of the same.

Servicing large tires is particularly cumbersome because of the weight of the wheel and the weight of the tire. Moreover, such servicing may be performed at remote sites and the environment at the remote sites may make the job even more cumbersome.

Thus, there is a real need for an improved tool for use in installing or removing or otherwise servicing a tire mounted on a multiple piece wheel and which is of relatively simple and inexpensive construction but sufficiently sturdy so as to be long lived in spite of rough handling and use in hostile terrains. The present invention is directed to meeting that need.

SUMMARY OF THE INVENTION

It is the principal object of the invention to provide a new and improved tool for use in installing or removing the bead seat band and rim flange of a multiple piece wheel as part of a tire changing or servicing operation.

An exemplary embodiment of the invention achieves the foregoing object in a tool having a tool body with a corner. A first elongated surface is disposed at the corner and is adapted to engage both a rim flange and a bead seat band in an axial direction. A second elongated surface is also provided at the corner in a position adjacent the first surface and at an acute angle to the first surface and adapted to engage the rim flange in an axial direction at a location spaced from the intended point of engagement of the rim flange by the first surface. The first and second surfaces define a notch opening away from the body and a tool mounting fixture is connected to the body generally oppositely of the notch.

In a preferred embodiment, there is a tool set comprising two of the tools mentioned above and in spaced relation to each other and oriented with their respective tool mounting fixtures extending away from one another.

In one embodiment, the tool mounting fixture is a pivot. Preferably, the pivot is a shaft.

In one embodiment, the shaft is generally parallel to the first surface.

A highly preferred embodiment contemplates that the body be generally triangular and have three corners including the first named corner mentioned above and three sides extending between two of the corners, and the tool mounting fixture is located on one of the sides opposite the first named corner.

In a preferred embodiment, the triangular frame includes two generally congruent, triangular plates and webs interconnect the plates in spaced relation. In a highly preferred embodiment, one web is located generally oppositely of the notch and the tool mounting fixture includes a shaft affixed to that particular web.

In a highly preferred embodiment, the first and second surfaces are defined by V-shaped strips, one affixed to each of the plates at the corner whereat the notch is located.

Other objects and advantages will become apparent from the following specification taken in connection with the accompanying drawings.

DESCRIPTION OF THE PREFERRED EMBODIMENT

Figure 1:
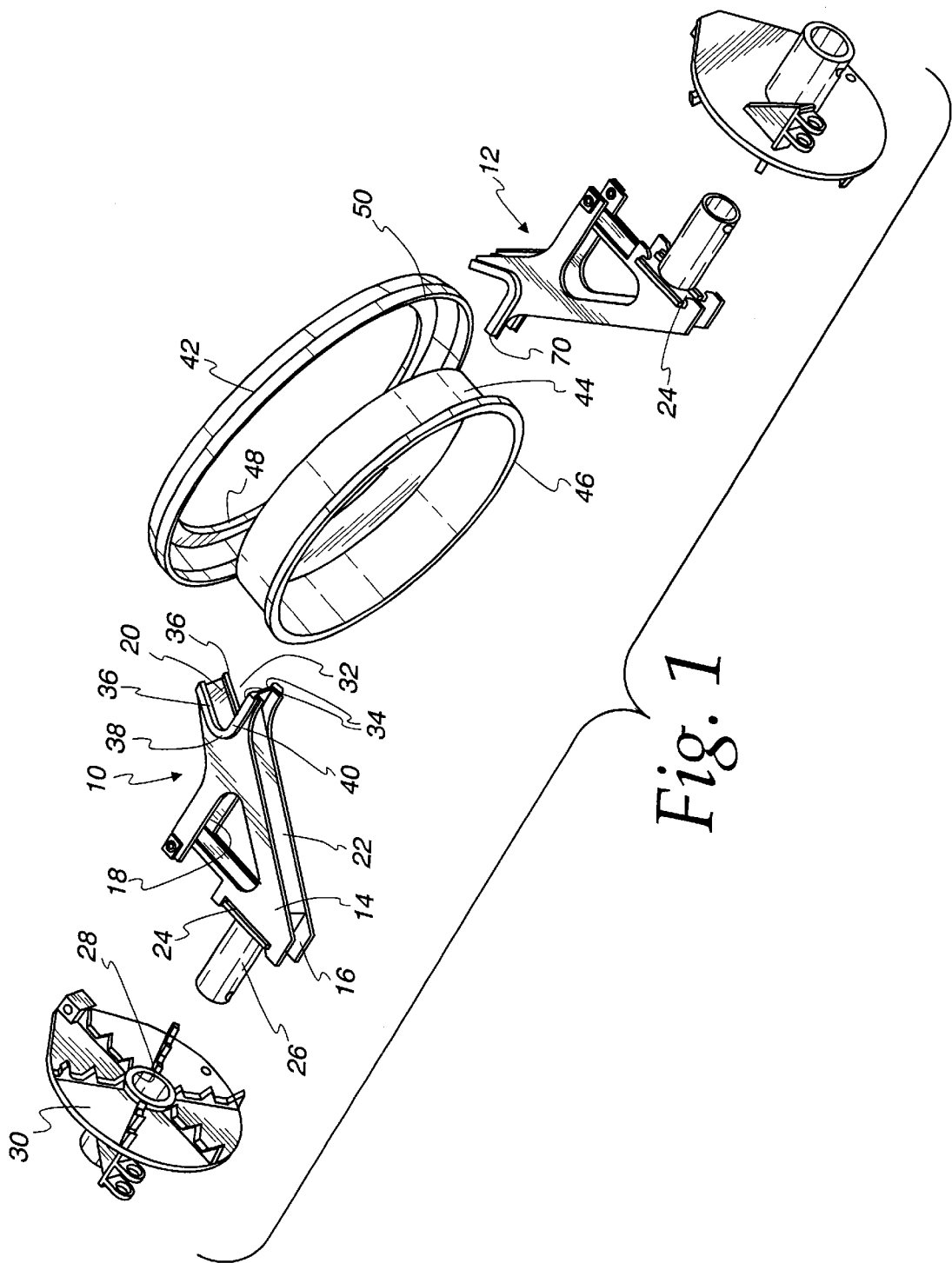
FIG. 1 is an exploded view of a set of two tools made according to the invention and shown in relation to a rim flange and a bead seat band as well as components of a tire handling apparatus to which the tool may be mounted.

An exemplary embodiment of a tire servicing tool made according to the invention is illustrated in FIG. 1 and will be described herein in a form that is particularly adapted to be employed with a tire manipulating apparatus sold under the registered trademark "Tirehand" and illustrated in commonly assigned U.S. Pat. No. 4,051,966 issued Oct. 4, 1977 to Larry G. Cotton, the entire disclosure of which is herein incorporated by reference. However, it will be understood that the invention is not limited to use with the particular apparatus described in the above-identified patent but may be used with other tire manipulating apparatus of different design as well. That is to say, virtually any tire manipulating apparatus that would include the provision for relatively moving two tools made according to the invention relative to one another and relative to a wheel assembly requiring servicing can benefit through the use of the tool of the invention.

Referring now to FIG. 1, the invention contemplates the use of two, identical tools, generally designated 10 and 12 in FIG. 1. Since the construction of the tool 10 is identical to the construction of the tool 12, only the former will be described in detail.

The tool 10 is made up of two spaced, parallel plates 14 and 16. The plates 14 and 16 are formed as congruent triangles with three sides and three corners and may have material at their center 18 removed so as to lighten the weight of the assembly.

Webs 20, 22 and 24 interconnect the plates 14 and 16. One of the webs, specifically the web 24, has a tool mounting fixture 26 secured thereto. In the form of the invention illustrated, the tool mounting fixture 26 is a pivot, and more specifically a shaft. The same is receivable in the opening 28 of the pad rotation claw 30 of a tire manipulating apparatus such as mentioned previously. Thus, where the pad rotation claw 30 is typically employed to grip a tire and is rotatable to facilitate positioning the tire during various tire servicing operations, by mounting the tool to the claw 30, the tool may be suitably rotated by the rotation device of the tire manipulating apparatus as well. A detent (not shown) such as a hairpin cotter key, a bolt or pin may be utilized to removably secure the two together. It is important to note, however, that any such cotter key, bolt or pin be located such that it will not be subject to appreciable force when the tool is being utilized.

At a corner of the triangular plates 14, 16 oppositely of the shaft 26, the tool 10 includes a V-shaped notch 32. The notch 32 is defined by first surfaces 34 and second surfaces 36. The first surfaces 34 are parallel to one another as are the surfaces 36 parallel to one another. The surfaces 34 are also parallel to the rotational axis of the shaft 26. The second surfaces 36 merge with the surfaces 34 at the apex 38 of the V-shaped notch 32, typically at an acute angle for purposes to be seen. In a preferred embodiment, each of the plates 14 and 16 is provided with a V-shaped strip 40 of hardened metal to provide the surfaces 34, 36.

FIG. 1 also shows a rim flange 42 and associated bead seat band 44. As can be appreciated, the bead seat band 44 includes a peripheral, radially outward directed flange 46 which nests against a radially inwardly directed flange 48 on the rim flange 42. In use, the first surfaces 32 are intended to engage both the bead seat band 44 and its flange 46 and the rim flange 42 at its side 50 opposite the flange 48. The surfaces 36 will typically be slightly spaced from contact with either of the wheel components during part of the operation but located so as to engage the rim flange 42 at the location on its outer side between the end 50 and the flange 48.

Figure 2:
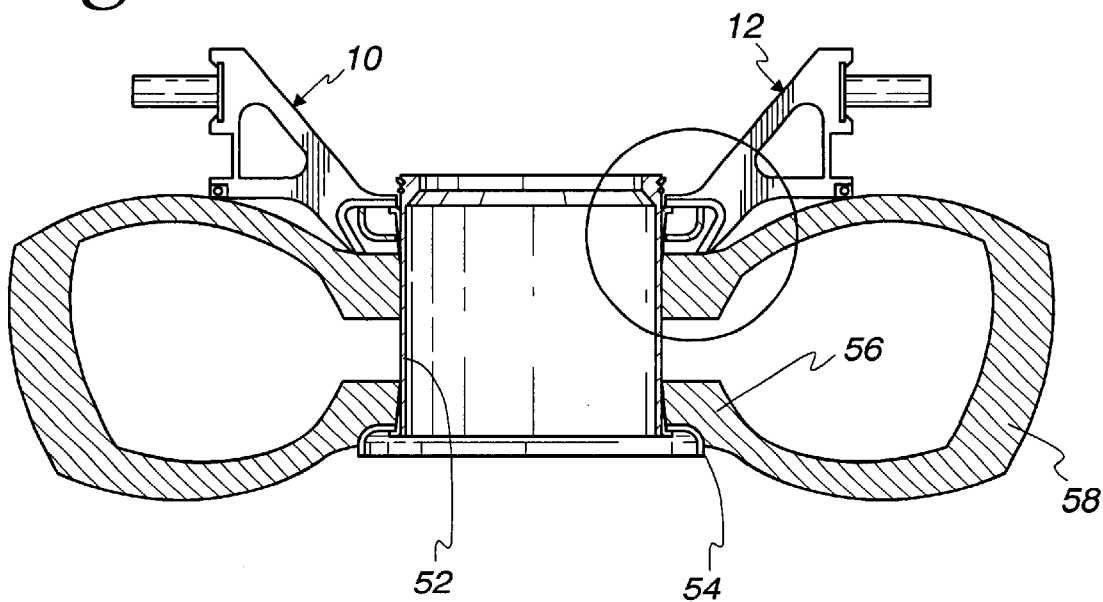
FIG. 2 is a sectional view illustrating the tool as applied to a wheel assembly, including a tire, during a tire servicing operation.
Figure 3:
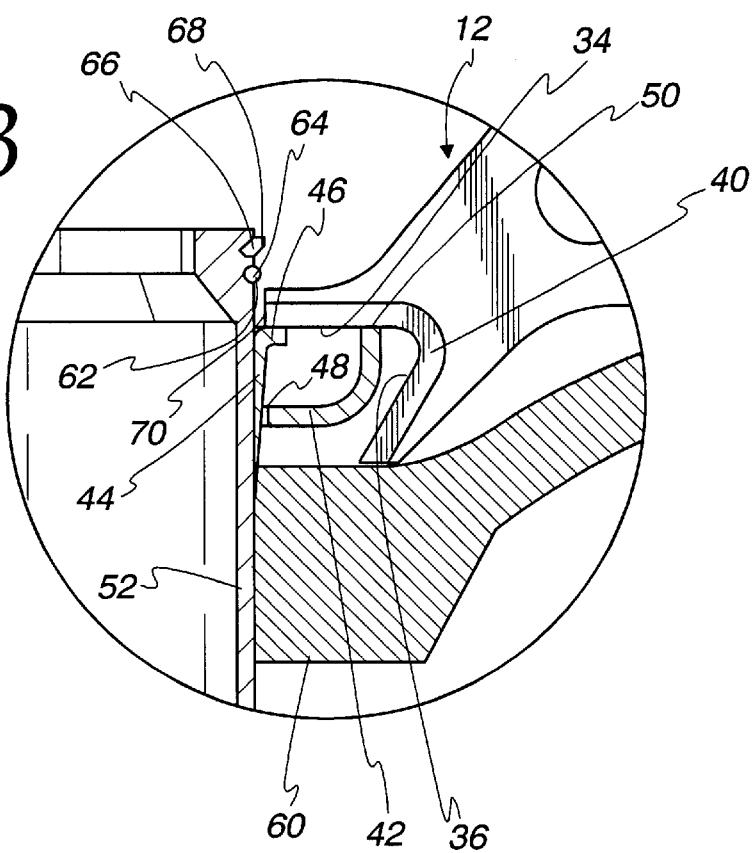
FIG. 3 illustrates part of the tool engaging a bead seat band and rim flange during a tire servicing operation.

Turning now to FIGS. 2 and 3, the use of the tool will be described in greater detail. A multiple piece wheel having a rim 52 is fitted with an inner rim flange 54 against which the lower bead 56 of a tire 58 rests. As seen in FIG. 3, the upper bead 60 of the tire underlies the outer rim flange 42 and the flange 48 of the rim flange 42 underlies the flange 46 on the bead seat band 44. At the end of the rim 52 adjacent the outer rim flange 42, an axially inner groove 62 is provided to receive an O-ring seal 64 that will normally seal the interface of the bead seat band 44 and the rim 52. Axially outward of the groove 62 is a further groove 66 in the rim 52 which receives a conventional, resilient lock ring 68.

In the normal configuration of the wheel assembly, the bead seat band 44 will be moved upwardly from the position shown in FIG. 3 to abut the lock ring 68 and establish sealing contact with the O-ring 66. Internal pressure within the tire 58 will cause the upper bead 60 to push the rim flange 42 into abutment with the flange 46 on the bead seat band 44.

As a consequence, the O-ring 66 will be wholly inaccessible and substantial force will hold the flange 46 to the bead seat band 44 in abutment with the lock ring 68.

To service the wheel, as, for example, by removing the tire 58 from the rim 52, the tire 58 is deflated and the tools 10, 12, applied to the wheel assembly at diametrically opposite locations. The tools 10 and 12 will be positioned so that the radially inner ends 70 of the first surfaces 34 will be located radially outward of the lock ring 68 and the O-ring 66. The first surfaces 34 will first be brought into abutment with the side 50 of the upper rim flange 44 and the same depressed until the surfaces 34 engage the flange 46 on the bead seat band 44. Further depressing movement will move the components to the position illustrated in FIG. 3 whereat both the O-ring 66 and the resilient lock ring 68 are readily accessible for removal of both. When that has been done, the tools 10 and 12 may be raised to remove the upper rim flange 42 and the bead seat band 44 from the rim 52. In this connection, it will be observed from FIG. 3 that because of the fact that the second surfaces 36 are at an acute angle to the first surfaces, they may extend under the rim flange 42. Upward movement of the tools 10, 12, will then cause the second surfaces 36 to engage rim flange 42 at a location between the flange 48 and the end 50 and lift both the rim flange 42 and the bead seat band 44 off of the rim. This is a particularly advantageous feature of the invention because in many instances, particularly where large, off the road vehicles are encountered, the bead seat band and the upper rim flange 42 alone may weigh several hundred pounds.

To replace the upper rim flange 42 and bead seat band 44, it is only necessary to locate the same on the rim 52 and move the same downwardly to approximately the position shown in FIG. 3. At this point, the O-ring 66 may be installed along with a lock ring 68. Inflation of the tire or use of the tools 10, 12 for lifting the upper rim flange 42 will then bring the bead seat band 44 into overlying relation to the O-ring seal 66 to establish a seal and into abutment with the lock ring 68. Inflation of the tire 58 will maintain the components in that relation.

It should be noted that while the foregoing description and the drawings illustrate servicing of the tire while the latter is in a horizontal position, the aforementioned installation or removal of the bead seat band and the rim flange can occur in virtually any orientation of the tire and no restriction is intended for use of the tool in any particular orientation.

From the foregoing, it will be appreciated that a set of tire servicing tools made according to the invention is simple in construction and yet extremely rugged so as to be long lived. Their use provides an excellent means of exposing the O-rings 66 and the lock rings 68 of a multiple piece wheel for installation or removal as well as a means for installing or removing both the upper rim flange 42 and the bead seat band 44. Consequently, it is not necessary to change tools during the tire servicing operation to use one set for achieving access to the lock ring 68 and the O-ring 66 and then switch to another for manipulating the heavy rim flange 42 and the bead seat ring 44.

I claim:

1. A tool for use in installing or removing the bead seat band and rim flange of a multiple piece wheel as part of a tire changing or servicing operation, comprising:

a tool body having a corner;

a first elongated surface at said corner adapted to engage a rim flange and a bead seat band in an axial direction;

a second elongated surface at said corner adjacent said first surface at an acute angle to said first surface and adapted to engage the rim flange in an axial direction at a location spaced from the intended point of engagement of the rim flange by said first surface;

said first and second surfaces defining a notch opening away from said tool body; and a tool mounting fixture connected to said body generally oppositely of said notch, said tool mounting fixture including a pivot having an axis generally parallel to said first surface and the direction of elongation thereof.

2. A tool set comprising two of the tools of claim 1 in spaced relation to each other and oriented with their respective tool mounting fixtures extending away from one another.

3. The tool of claim 1 wherein said pivot is a shaft.

4. A tool set comprising two of the tools of claim 1 in spaced relation to each other and oriented with the respective tool mounting fixtures extending away from one another.

5. A tool for use in installing or removing the bead seat band and rim flange of a multiple piece wheel as part of a tire changing or servicing operation, comprising:

a tool body having a corner;

a first elongated surface at said corner adapted to engage a rim flange and a bead seat band in an axial direction;

a second elongated surface at said corner adjacent said first surface at an acute angle to said first surface and adapted to engage the rim flange in an axial direction at a location spaced from the intended point of engagement of the rim flange by said first surface;

said first and second surfaces defining a notch opening away from said tool body; and a tool mounting fixture connected to said body generally oppositely of said notch, said mounting fixture including a pivot in a form of a shaft, said shaft being generally parallel to said first surface.

6. A tool for use in installing or removing the bead seat band and rim flange of a multiple piece wheel as part of a tire changing or servicing operation, comprising:

a tool body having a corner, said body being a triangular frame having three corners, including said first-named corner, and three sides each extending between two of said corners;

a first elongated surface at said first-named corner adapted to engage a rim flange and a bead seat band in an axial direction;

a second elongated surface at said first-named corner adjacent said first surface at an acute angle to said first surface and adapted to engage the rim flange in an axial direction at a location spaced from the intended point of engagement of the rim flange by said first surface;

said first and second surfaces defining a notch opening away from said tool body; and a tool mounting fixture connected to said body generally oppositely of said notch, said tool mounting fixture is located on the one of said sides opposite said first-named corner.

7. The tool of claim 6 wherein said triangular frame includes two, generally congruent triangular plates, and webs interconnecting said plates in spaced relation.

8. The tool of claim 7 wherein one web is located generally oppositely of said notch and said tool mounting fixture includes a shaft affixed to said one web.

9. The tool of claim 8 wherein said first and second surfaces are defined by V-shaped strips, one affixed to each of said plates at said corner.

* * * * *